US006567481B1

(12) United States Patent
Molnar (10) Patent No.: US 6,567,481 B1
(45) Date of Patent: May 20, 2003

(54) RECEIVERS INCLUDING ITERATIVE MAP DETECTION AND RELATED METHODS

(75) Inventor: Karl James Molnar, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/303,251

(22) Filed: Apr. 30, 1999

(51) Int. Cl.[7] .............................. H03D 1/00; H04L 27/06
(52) U.S. Cl. ........................ 375/341; 375/262; 714/794
(58) Field of Search ................................ 375/341, 340, 375/262, 265, 232; 714/795, 796, 786, 794, 780

(56) References Cited

U.S. PATENT DOCUMENTS

| | | | |
|---|---|---|---|
| 5,278,871 A | 1/1994 | Rasky et al. ................... | 375/99 |
| 5,467,374 A | * 11/1995 | Chennakeshu et al. ...... | 375/340 |
| 6,343,368 B1 | * 1/2002 | Lerzer ......................... | 714/796 |
| 6,359,935 B1 | * 3/2002 | Hui et al. .................... | 375/262 |

OTHER PUBLICATIONS

P. Robertson; *Illuminating the Structure of Code and Decoder of Parallel Concatenated Recursive Systematic (Turbo) Codes*; Proceedings of the Global Telecommunications Conference; (Nov. 24, 1994) pp. 1298–1303.

Hoeher; *Iterative Decoding/Demodulation of Coded DPSK Systems;* IEEE Global Telecommunications Conference; (Nov. 8, 1998) pp. 598–603.

Marsland et al; *Multiple Differential Detection of Parallel Concatenated Convolutional (Turbo) Codes in Correlated Fast Rayleigh Fading;* IEEE Journal of Selected Areas in Communications; (Feb. 1, 1998) vol. 15, No. 2; pp. 265–275.

International Search Report for PCT/US 00/06065.

Ungerboeck, Gootfried, *Adaptive Maximum–Likelihood Receiver for Carrier–Modulated Data–Transmission Systems, IEEE Transcations on Communications,* vol. Com–22, No. 5, pp. 624–636 (May 1974).

Molnar, Karl J., et al., *A Novel Fractionally–Spaced MLSE Receiver and Channel Tracking with Side Information, IEEE VTC '98,* pp. 2251–2255 (1998).

Bottomley, G., *Soft Information in ADC,* Ericsson Inc., pp. 1–22 (Jul. 1993).

Bahl, L. R., et al., *Optimal Decoding of Linear Codes for Minimizing Symbol Error Rate, IEEE Transactions on Information Theory,* pp. 284–287 (Mar. 1974).

(List continued on next page.)

*Primary Examiner*—Phuong Phu
(74) *Attorney, Agent, or Firm*—Myers Bigel Sibley & Sajovec (57) ABSTRACT

Methods and receivers are described for receiving data transmitted over a radio communications channel wherein the data is transmitted as a plurality of sequential symbols wherein each sequential symbol is determined as a function of a previous symbol and a respective differential symbol corresponding to a portion of the data being transmitted. In particular, a plurality of received segments are sampled wherein the received segments correspond to respective ones of the transmitted symbols, and an initial differential MAP symbol estimation is performed for estimated received symbols corresponding to the sampled received segments to provide initial estimates of the differential symbols. New received symbol estimates are calculated using the initial estimates of the differential symbols, and a subsequent differential MAP symbol estimation is performed using the new received symbol estimates to provide improved estimates of the differential symbols. Bit probability calculations are performed on the improved estimates of the differential symbols.

34 Claims, 6 Drawing Sheets

OTHER PUBLICATIONS

Baum, Leonard E., et al., *A Maximization Technique Occurring in the Statistical Analysis of Probabilistic Functions of Markov Chains*, The Annals of Mathematical Statistics, vol. 41, No. 1, pp. 164–171 (1970).

Sundberg, Rolf, *An Iterative Method for Solution of the Likelihood Equations for Incomplete Data from Exponential Families*, Commun. Statistic.–Simula. Computa, vol. B5, No. 1, pp. 55–64 (1976).

Erkurt, Murat, et al., *Joint Data Detection and Channel Estimation for Rapidly Fading Channels*, IEEE, pp. 910–914 (1992).

Kaleh, Chassan, et al., *Joint Parameter Estimation and Symbol Detection for Linear or Nonlinear Unknown Channels*, IEEE Transactions on Communications, vol. 42, No. 7, pp. 2406–2413 (Jul. 1994).

Krishnamurthy, Vikram, *Adaptive Estimation of Hidden Nearly Completely Decomposable Markov Chains with Applications in Blind Equalization*, International Journal of Adaptive Control and Signal Processing, vol. 8, pp. 237–260 (1994).

Cirpan, Hakan A., et al., *Stochastic Maximum Likelihood Methods for Semi–Blind Channel Estimation*, IEEE Signal Processing Letters, vol. 5, No. 1, pp. 21–26 (Jan. 1998).

Baccarelli, Enzo, et al., *Combined Channel Estimation and Data Detection Using Soft Statistics for Frequency–Selective Fast–Fading Digital Links*, IEEE Transactions on Communications, vol. 46, No. 4, pp. 424–427 (Apr. 1998).

* cited by examiner

SYMBOL FOLDING FOR FORWARD EQUALIZATION

FIG. 1.
(PRIOR ART)

SYMBOL FOLDING FOR BACKWARD EQUALIZATION

TERMS USED IN MAP DIFFERENTIAL SYMBOL LOG-LIKELIHOOD

FIG. 4.

TERMS USED IN SUBOPTIMAL MAP DIFFERENTIAL SYMBOL LOG-LIKELIHOOD

RECEIVERS INCLUDING ITERATIVE MAP DETECTION AND RELATED METHODS

FIELD OF THE INVENTION

The present invention relates to the field of communications and more particularly to communications systems including equalizers used to detect coherent symbols and related methods.

BACKGROUND OF THE INVENTION

In current D-AMPS (IS-136) cellular communications systems, maximum likelihood sequence estimation (MLSE) equalizers detect coherent symbol values using forward or backward detection at the mobile terminal depending on the quality of the current and next slot synchronization words. At the base-station, backward MLSE detection used for symbols to the left of the synchronization sequence and forward detection is used for symbols to the right of the synchronization sequence. For example, MLSE equalization in the forward direction can be performed using the Viterbi algorithm as discussed in the reference by Ungerboeck entitled "Adaptive Maximum-Likelihood Receiver for Carrier-Modulated Data-Transmission Systems", IEEE Trans. Comm., COM-22: pages 624–636, May 1974. The disclosure of this reference is hereby incorporated herein in its entirety by reference.

Overall log-likelihoods used to detect a sequence of symbols [$a_0$, $a_1$, ..., $a_N$] can take the form:

$$l\{a; y\} = \sum_{n=0}^{N} \left[ 2R\{a_n^* z_n\} - |a_n|^2 s_{0,n} - \sum_{l=1}^{\min(n,N)} 2R\{a_n^* s_{l,n} a_{n-l}\} \right]. \quad (1)$$

In this equation, the equalization parameters $z_n$ and $s_{l,n}$ are described in the Ungerboeck reference, and these equalization parameters are extended to fractionally-spaced receivers in the reference by Molnar et al. entitled "A Novel Fractionally-Spaced MLSE Receiver And Channel Tracking With Side Information", Proc. 48$^{th}$ IEEE Veh. Tech. Conf., May 1998. The disclosure of this reference is hereby incorporated herein in its entirety by reference.

Figure 1:
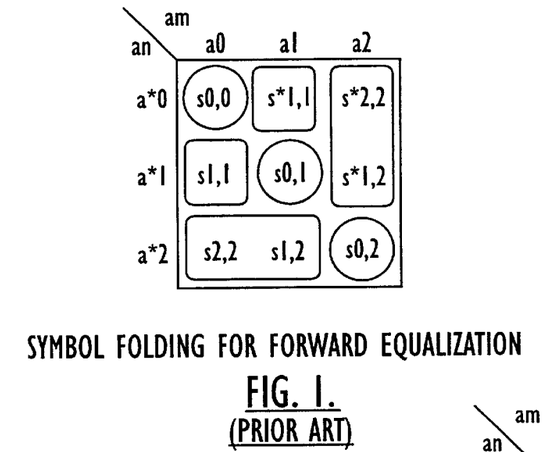
FIG. 1 illustrates symbol folding for forward equalization according to the prior art.

The term inside the square brackets of Equation (1) forms the metric for the symbol $a_n$. This approach takes advantage of the symmetry of the $s_{l,n}$ terms, and the summation of the s-terms is shown in FIG. 1 for an example with N=2. The circles correspond to the $s_{0,n}$ terms and for each n, the s-terms to the left and to the top of the circled $s_{0,n}$ terms correspond to the terms $s_{l,n}$ for a specific value of n.

When backward equalization is used, the following log-likelihood is used to determine the metric for the Viterbi algorithm:

$$l\{a; y\} = \sum_{n=0}^{N} \left[ 2R\{a_n^* z_n\} - |a_n|^2 s_{0,n} - \sum_{l=1}^{\min(N-n,N)} 2R\{a_n^* s_{l,n+l} a_{n+l}\} \right] \quad (2)$$

Figure 2:
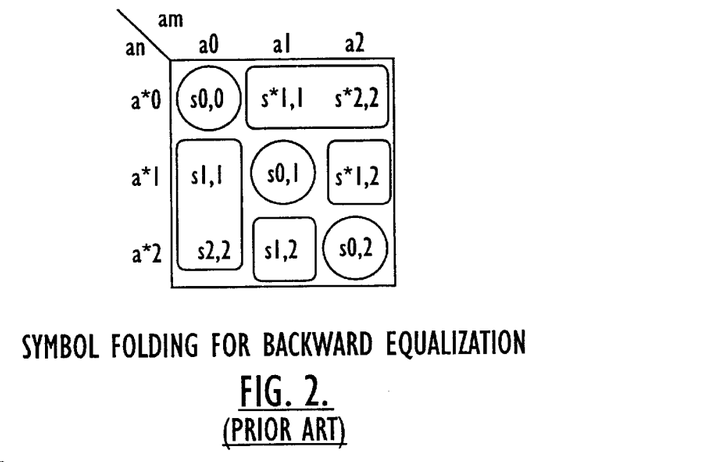
FIG. 2 illustrates symbol folding for backward equalization according to the prior art.

Note that the first two terms in the metric are the same for either forward or backward equalization, while the summation of the s-terms is different. The summation of the s-terms for this case is shown in FIG. 2, again for the case of N=2. The circled terms remain the same as for the forward metric, but now the s-terms for a specific value of n are chosen as those terms to the right and below the n'th diagonal element.

For differential-QPSK modulation, the coherent symbols can be estimated using the above MLSE equalization approach. Estimates of the differential symbols and bits can then be obtained from the detected coherent symbols, while soft differential bit information can be obtained from the saved equalization metrics as discussed in the reference by Bottomley entitled "Soft Information in ADC", Technical Report, Ericsson-GE, 1993. The disclosure of this reference is hereby incorporated herein in its entirety by reference.

For digital communications, maximum a-posteriori (MAP) detection has been used as discussed in the reference by Bahl et al. entitled "Optimal Decoding of Linear Codes for Minimizing Symbol Error Rate", IEEE Trans. Inf. Theory, IT-20: pages 284–287, March 1974. This approach is also similar to approaches discussed in the following references: Baum et al., "A Maximization Technique Occurring in the Statistical Analysis of Probabilistic Functions of Markov Chains", Ann. Math. Statist., 41: pages 164–171, 1970; Sundberg, "An Iterative Method for Solution of the Likelihood Equations for Incomplete Data from Exponential Families", Comm. Statist. Simulation. Comput., B5: pages 55–64, 1976; Erkurt et al., "Joint Detection and Channel Estimation for Rapidly Fading Channels", Globecom 1992, pages 910–914, December 1992; Kaleh et al., "Joint Parameter Estimation and Symbol Detection for Linear or Non-linear Unknown Channels", IEEE Trans. Comm. 42(7): pages 2406–2413, July 1994; Krishnamurthy, "Adaptive Estimation of Hidden Nearly Completely Decomposable Markov Chains With Applications in Blind Equalization", "International Journal of Adaptive Control and Signal Processing", 8: pages 237–260,1994; Cirpan et al., "Stochastic Maximum Likelihood Methods for Semi-Blind Channel Estimation", IEEE Signal Processing Letters, 5(1): pages 21–24, January 1998; and Baccarelli et al., "Combined Channel Fast-Fading Digital Links", IEEE Trans. Comm., 46(4): pages 424–427, April 1998. The disclosures of each of these references are hereby incorporated herein in their entirety by reference.

The metric for MAP detection of the coherent symbols can be derived from the following overall log-likelihood:

$$l\{a; y\} = \sum_{n=0}^{N} 2R\{a_n^* z_n\} - \sum_{n=0}^{N} \sum_{m=0}^{N} a_n^* h_{n,m} a_m. \quad (3)$$

Figure 3A:
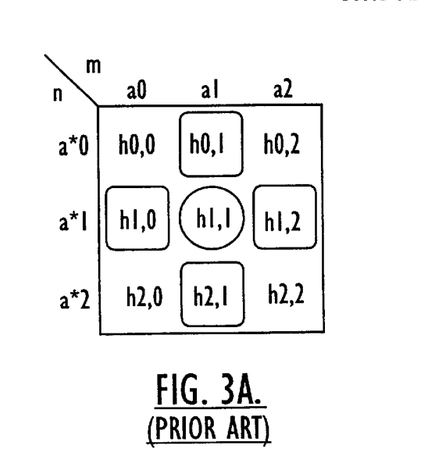
FIGS. 3A and 3B illustrate terms used in a MAP symbol metric according to the prior art.

The MAP metric is found by collecting all terms containing $a_n$. For example, in FIG. 3A, the symbol $a_1$ contribution to the double sum in Equation (3) is shown by the enclosed $h_{n,m}$ terms. The $h_{n,m}$ terms are related to the s-parameters in the following manner:

$$h_{n,m} = \begin{cases} s_{n-m,n} & n \geq m; \\ s_{n-m,m} = s_{m-n,m}^* & n < m. \end{cases} \quad (4)$$

Figure 3B:
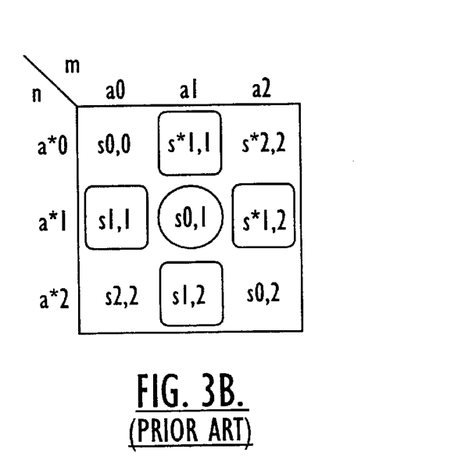

The corresponding terms are shown in FIG. 3B. Using the s-parameters from FIG. 3B, the contribution to the MAP metric for symbol an can be written as:

$$l\{a_n; y\} = 2R\{a_n^* z_n\} - |a_n|^2 s_{0,n} - \quad (5)$$
$$\sum_{l=1}^{\min(n,N)} 2R\{a_n^* s_{l,n} a_{n-l}\} - \sum_{l=1}^{\min(N-n,N)} 2Ry\{a_n^* s_{l,n}^* a_{n+l}\}.$$

The terms contributing to the double summation in Equation (3) use the same folding as in the forward and backward MLSE equalizers previously discussed.

Notwithstanding the equalizer systems and methods discussed above, there continues to exist a need in the art for improved equalizer systems and methods.

SUMMARY OF THE INVENTION

It is therefore an object of the present invention to provide improved methods and receivers for receiving data transmitted over radio communications channels.

This and other objects are provided according to the present invention by methods for receiving data transmitted over a radio communications channel wherein the data is transmitted as a plurality of sequential symbols wherein each sequential symbol is determined as a function of a previous symbol and a respective differential symbol corresponding to a portion of the data being transmitted. A plurality of received segments are sampled wherein the received segments correspond to respective ones of the transmitted symbols, and an initial differential MAP symbol estimation is performed for estimated received symbols corresponding to the sampled received segments to provide initial estimates of the differential symbols. New received symbol estimates are calculated using the initial estimates of the differential symbols, and a subsequent differential MAP symbol estimation is performed using the new received symbol estimates to provide improved estimates of the differential symbols. Bit probability calculations are performed on the improved estimates of the differential symbols. Improved data reception can thus be provided over radio communications channels.

The steps of calculating the new received symbol estimates and performing subsequent differential MAP symbol estimation can be repeated at least once and the bit probability calculations can be performed on the improved estimates of the differential symbols provided during subsequent differential MAP symbol estimation. More particularly, the steps of calculating the new received symbol estimates and performing subsequent differential MAP symbol estimation can be repeated a predetermined number of times. Alternately, the steps of calculating the new received symbol estimates and performing subsequent differential MAP symbol estimation can be repeated until the improved estimates of the differential symbols converge to within a predetermined threshold.

In addition, the estimates of the bit values can be decoded. Furthermore, the decoded estimates of the bit values can be re-encoded to provide re-encoded received symbol estimates, subsequent differential MAP symbol estimation can be performed using the re-encoded received symbol estimates to provide further improved estimates of the differential symbols, and bit probability calculations can be performed on the further improved estimates of the differential symbols.

The steps of performing the differential MAP symbol estimation can each comprise performing log-likelihood calculations for estimated received symbols corresponding to the sampled transmission segments, and performing differential symbol probability calculations. The log-likelihood calculations can also be preceded by estimating channel parameters based on the sampled transmission segments wherein the log-likelihood calculations use the estimated channel parameters. More particularly, the estimated channel parameters can be estimated s-parameters and z-parameters.

The methods and receivers of the present invention can thus provide improved data reception.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Improved methods for equalization and detection of maximum a-posteriori (MAP) probabilities of differential bits associated with differential-QPSK (D-QPSK) modulation will now be described. In general, an iterative approach is used for computing bit probabilities from soft-detected symbol values which are used for bit detection. Alternately, bit probabilities can be computed using a post-processing step from a previous equalization process.

Figure 4:
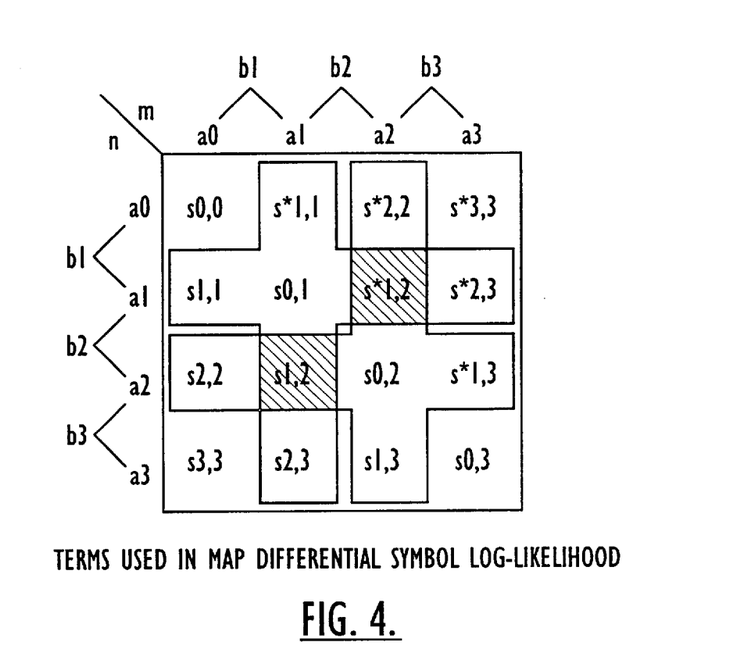
FIG. 4 illustrates terms used in a first MAP differential symbol log-likelihood calculation according to the present invention.

For differential PSK modulation (such as D-QPSK modulation), $a_n = b_n a_{n-1}$, where $b_n$ is the symbol defined by a differential bit-to-symbol mapping function. In other words, $a_n$ (the symbol transmitted at time n) is a function of $b_n$ (representing the binary data to be transmitted) and $a_{n-1}$, (the symbol previously transmitted at time n−1). Furthermore, it can be assumed that both $|a_n|^2=1$ and $|b_n|^2=1$ for all n, so that $b_n = a_n a^*_{n-1}$. This notation can allow for MAP detection of the differential symbols and bits based on the coherent metrics. To detect the differential symbol $b_n$, the log-likelihood is used to generate a new log-likelihood including the terms $b_n$. With reference to FIG. 4, the log-likelihood for coherent symbols $a_n$ and $a_{n-1}$ can be used with $a_n = b_n a_{n-1}$ and $a_{n-1} = b^*_n a_n$ to generate the log-likelihood for differential symbols $b_n$.

FIG. 4 shows the terms used for detecting $b_2$. The enclosed terms represent the terms within the double summation of Equation (3) and are obtained from individual log-likelihoods $l\{a_2;y\}$ and $l\{a_1;y\}$. The shaded terms $h_{1,2}$ and $h_{2,1}$ are counted twice and should thus be accounted for by subtraction of the duplicate terms from the resulting log-likelihood. The log-likelihood for the differential symbol $b_n$ is derived by combining $l\{a_n;y\}$ and $l\{a_{n-1};y\}$, removing the duplicate terms, and replacing $a_n$ and $a_{n-1}$, with the forms that contain $b_n$. The coherent log-likelihoods including $b_n$ are:

$$l\{a_n; y\} = 2\Re\{b_n^* a_{n-1}^* z_n\} - s_{0,n} - \qquad (6)$$
$$\sum_{l=1}^{\min(n,N)} 2\Re\{b_n^* a_{n-1}^* s_{l,n} a_{n-l}\} - \sum_{l=1}^{\min(N-n,N)} 2\Re\{b_n^* a_{n-1}^* s_{l,n+l}^* a_{n+l}\},$$

and:

$$l\{a_{n-1}; y\} = 2\Re\{b_n^* a_n^* z_{n-1}\} - s_{0,n-1} - \qquad (7)$$
$$\sum_{l=1}^{\min(n-1,N)} 2\Re\{b_n a_n^* s_{l,n-1} a_{n-1-l}\} - \sum_{l=1}^{\min(N-n+1,N)} 2\Re\{b_n a_n^* s_{l,n-1+l}^* a_{n-1+l}\}.$$

Combining Equations (6) and (7) and eliminating those terms not containing $b_n$ and the duplicate terms results in $l\{b_n; y\}$ as follows:

$$l\{b_n; y\} = 2\Re\{b_n^* a_{n-1}^* z_n\} + 2\Re\{b_n^* a_n^* z_{n-1}\} - 2\Re\{b_n^* s_{1,n}\} - \qquad (8)$$
$$\sum_{l=2}^{\min(n,N)} 2\Re\{b_n^* a_{n-1}^* s_{l,n} a_{n-l}\} - \sum_{l=1}^{\min(N-n,N)} 2\Re\{b_n^* a_{n-1}^* s_{l,n+l}^* a_{n+l}\} -$$
$$\sum_{l=1}^{\min(n-1,N)} 2\Re\{b_n a_n^* s_{l,n-1} a_{n-1-l}\} - \sum_{l=2}^{\min(N-n+1,N)} 2\Re\{b_n a_n^* s_{l,n-1+l}^* a_{n-1+l}\}.$$

It should be noted that the terms including $s_{1,n}$ are not dependent on $a_n$ or $a_{n-1}$.

An alternate log-likelihood can also be obtained by rewriting some of the terms in Equations (6) and (7) expressing $a_n$ as either $a_n = b_n a_{n-1}$ or $a_{n-1} = b^*_{n+1} a_{n+1}$. The resulting coherent log-likelihoods are as follows:

$$l\{a_n; y\} = \Re\{b_n^* a_{n-1}^* z_n\} + \Re\{b_{n+1} a_{n+1}^* z_n\} - s_{0,n} - \qquad (9)$$
$$\sum_{l=1}^{\min(n,N)} 2\Re\{b_n^* a_{n-1}^* s_{l,n} a_{n-l}\} - \sum_{l=1}^{\min(N-n,N)} 2\Re\{b_{n+1} a_{n+1}^* s_{l,n+l}^* a_{n+l}\},$$

and:

$$l\{a_{n-1}; y\} = \Re\{b_n a_n^* z_{n-1}\} + \Re\{b_{n-1}^* a_{n-2}^* z_{n-1}\} - \qquad (10)$$
$$s_{0,n-1} - \sum_{l=1}^{\min(n-1,N)} 2\Re\{b_{n-1}^* a_{n-2}^* s_{l,n-1} a_{n-1-l}\} -$$
$$\sum_{l=1}^{\min(N-n+1,N)} 2\Re\{b_n a_n^* s_{l,n-1+l}^* a_{n-1+l}\}.$$

Collecting the terms with $b_n$ and eliminating the duplicate terms results in an alternate $l\{b_n; y\}$ as follows:

$$l\{b_n; y\} = \Re\{b_n^* a_{n-1}^* z_n\} + \Re\{b_n a_n^* z_{n-1}\} - 2\Re\{b_n^* s_{1,n}\} - \qquad (11)$$
$$\sum_{l=2}^{\min(n,N)} 2\Re\{b_n^* a_{n-1}^* s_{l,n} a_{n-l}\} - \sum_{l=2}^{\min(N-n+1,N)} 2\Re\{b_n a_n^* s_{l,n-1+l}^* a_{n-1+l}\}.$$

Figure 5:
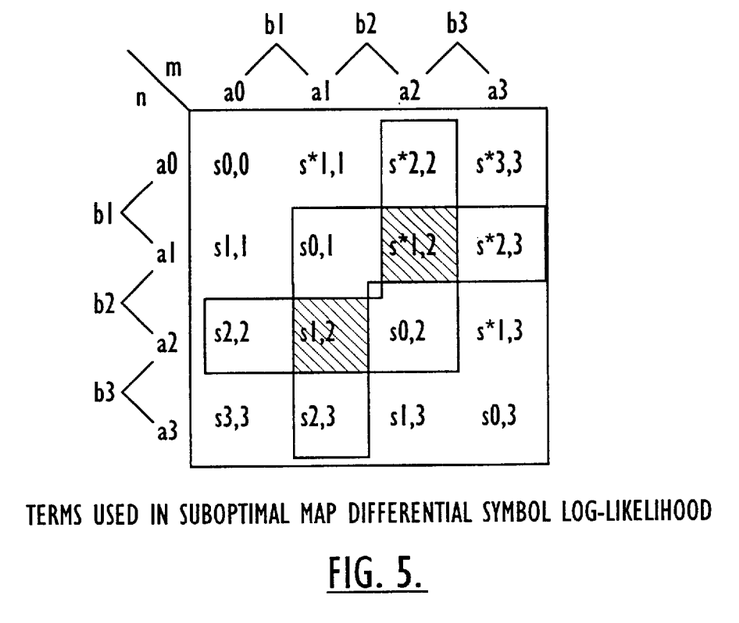
FIG. 5 illustrates terms used in a second MAP differential symbol log-likelihood calculation according to the present invention.

The s-terms used in the log-likelihood which come from the double summation of Equation (3) are shown in FIG. 5. Note that $\Re\{a^*_n z_n\}$ has been arbitrarily decomposed into one term including $b_n$ and another term not, including $b_n$. Alternate decompositions are also possible.

Calculation of the log-likelihood will now be discussed as follows. In particular, the differential symbol $b_n$ can be written as $b_n = r_n^T b_n$, where $b_n$ is a vector including the symbol alphabet (i.e., the possible symbol values that bn may take), and $r_n$ is a real vector including all zeros except for a single element which has a value one (i.e., an indicator vector). The log-likelihood $l\{b_n; y\}$ can thus be written in the following form:

$$l\{b_n, y\} = r_n^T u_n(\{a_n\}), \qquad (12)$$
$$= l\{r_n, y\}.$$

In this form, $u_n(\{a_n\})$ is a vector of log-likelihoods with $b_n$ replacing $b_n$. Using the log-likelihood of Equation (12), for example, the following equation can be developed:

$$u_n(\{a_n\}) = \Re\{b_n^* a_{n-1}^* z_n\} + \Re\{b_n a_n^* z_{n-1}\} - 2\Re\{b_n^* s_{1,n}\} - \qquad (13)$$
$$\sum_{l=2}^{\min(n,N)} 2\Re\{b_n^* a_{n-1}^* s_{l,n} a_{n-l}\} -$$
$$\sum_{l=2}^{\min(N-n+1,N)} 2\Re\{b_n a_n^* s_{l,n-1+l}^* a_{n-1+l}\}.$$

By estimating the vector $r_n$, $b_n$ can be detected. The estimate of $r_n$ will be denoted as $\hat{r}_n$. In particular, the estimate can be $\hat{r}_n = E\{r_n|y\}$ which is a vector with the t'th element equal to $p(r_n = e_t|y)$, where $e_t$ is a unit vector with a one in the t'th position and zero's elsewhere. For D-QPSK modulation, $t \in \{0, 1, 2, 3\}$. The estimate of $r_n(t)$ is computed by:

$$p(r_n = e_t | y) = \frac{\exp(l\{r_n(t); y\})}{\sum_{s=0}^{T-1} \exp(l\{r_n(s); y\})} \qquad (14)$$

where:

$$\sum_{t=0}^{T-1} \hat{r}_n(t) = 1.$$

Given an estimate of $\hat{r}_n$, the probabilities of the differential bits can be calculated by evaluating partial probabilities. For example, if $b_n$ corresponds to data bits $d_{2n}$, $d_{2n+1}$, then the partial probability for $d_{2n} = 0$ is calculated as follows:

$$p(d_{2n} = 0 | y) = \frac{\sum_{\{t: d_{2n}=0\}} \hat{r}_n(t)}{\sum_{s=0}^{T-1} \hat{r}_n(s)} \qquad (15)$$

Then $p(d_{2n}=1|y)$ is simply $1-p(d_{2n}=0|y)$. The detection of $d_{2n+1}$ is performed in a similar manner. The estimate of bits $d_{2n}$, $d_{2n+1}$ can be either a hard detection (i.e., the values with the highest probabilities) or a soft detection in terms of probability values.

The calculation of $\hat{r}_n$ may require that $a_0, \ldots, a_N$ be known. In practice, $\{a_n\}$ is estimated using estimates of $b_n$, so that estimates of $b_n$ may be required. To accomplish this according to the present invention, an iterative solution is provided. If previous estimates of $\{r_n\}$ exist (and thus previous estimates of $\{b_n\}$ exist), these estimates can be used to compute new estimates for $\{a_n\}$. For example, if $a_0$ is a known symbol (e.g. a synchronization symbol), then $\hat{a}_1$ can be computed using $\hat{a}_1 = \hat{r}_1^T b_1 \hat{a}_1$ and similar estimates can be computed for $\hat{a}_2$ through $\hat{a}_N$. These estimates are estimates of $\{a_n\}$ using the soft detected values of $\{b_n\}$. For cases where there are distributed synchronization symbols, the estimation can be started from multiple known symbols. Furthermore, estimates of $\hat{r}_n$ can be updated when detecting $b_n$ using the newly computed values of $\hat{r}_n$. In summary, new estimates of $\{\hat{r}_n\}$ can be calculated using prior estimates of $\{a_n\}$. The iteration can then proceed by updating $\{a_n\}$ with these newly computed soft differential symbol and bit estimates.

During this iterative procedure, decoding may take place on the detected bit information, and this decoded information can be fed back for use in the next iteration of the equalizer. Re-estimation of the equalization parameters z and s can also be performed during this iterative procedure, and the re-estimated equalization parameters can be fed back for use in the next iteration of the equalizer.

Figure 6:
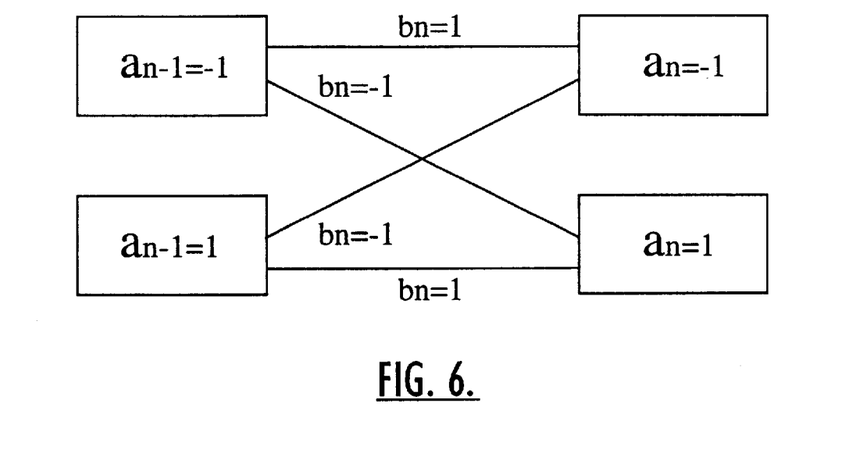
FIGS. 6 and 7 illustrate states for differential phase shift keying according to the present invention.
Figure 7:
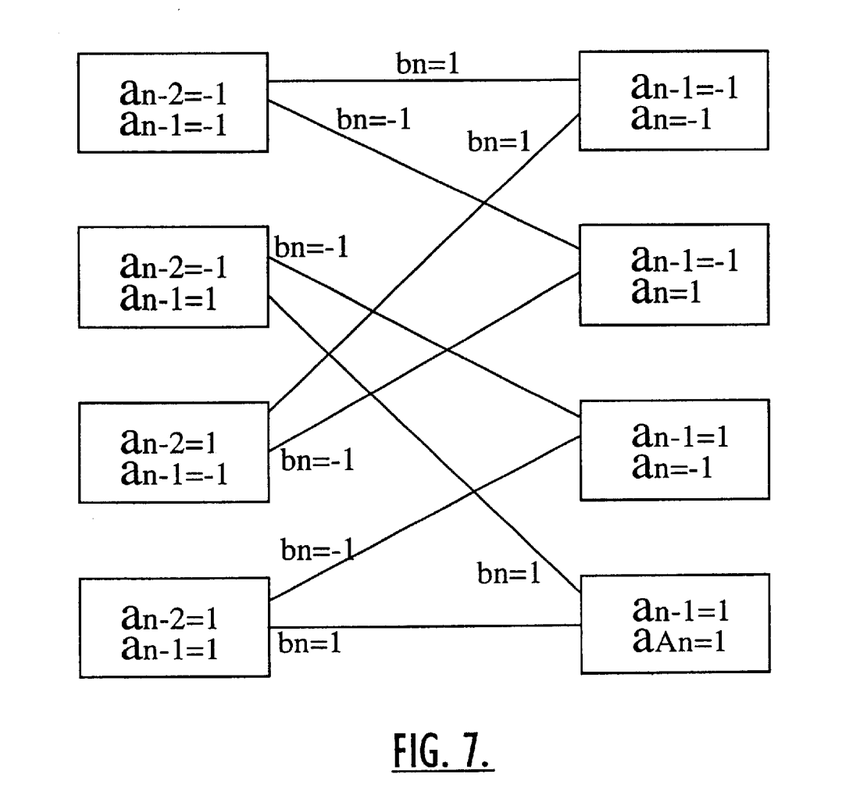

An implementation of a receiver including the equalization techniques discussed above will now be discussed with reference FIGS. 6–8. For differential-PSK modulation (such as D-QPSK modulation), the transmitted information is included in the differential symbol $b_n$ where $a_n = b_n a_{n-1}$. An example of the metric branches where $a_{n-1}$, $a_n$, and $b_n$ can have the possible values of −1 or 1 is shown in FIG. 6. An alternate example with a larger number of states is provided in FIG. 7. Using equalization techniques according to the present invention, the log-likelihood of the received differential symbol $b_n$ can be estimated. More particularly, this estimate can be obtained by estimating the probability of each of the values that $b_n$ is allowed to take using the vector $\hat{r}_n$ discussed above.

A log-likelihood can be generated using Equation (8) as discussed above, wherein the log-likelihood is a combination of the log-likelihoods from forward and backward equalization as provided in Equations (6) and (7). This log-likelihood includes z and s parameters from different values of n. In addition, this log-likelihood is calculated using estimated values of the parameters $a_{-l}$ for various values of l. Once a form of the log-likelihood is chosen, the vector $u_n$ is constructed using the vector $b_n$, where $b_n$ is a vector that includes the possible values that $b_n$ is allowed to take.

The vector $\hat{r}_n$ is then estimated. In particular, each element of the vector $\hat{r}_n$ includes the probability $p(r_n = e_l | y)$ where $e_l$ is a vector that has a single element equal to one and the remaining elements equal to zero. In particular, $e^T{}_l b_n$ equals one element of $b_n$ so that each element of $\hat{r}_n$ corresponds to the probability that the corresponding element in $b_n$ was transmitted, where $\hat{r}_n$ can be calculated using Equation (14).

Figure 8:
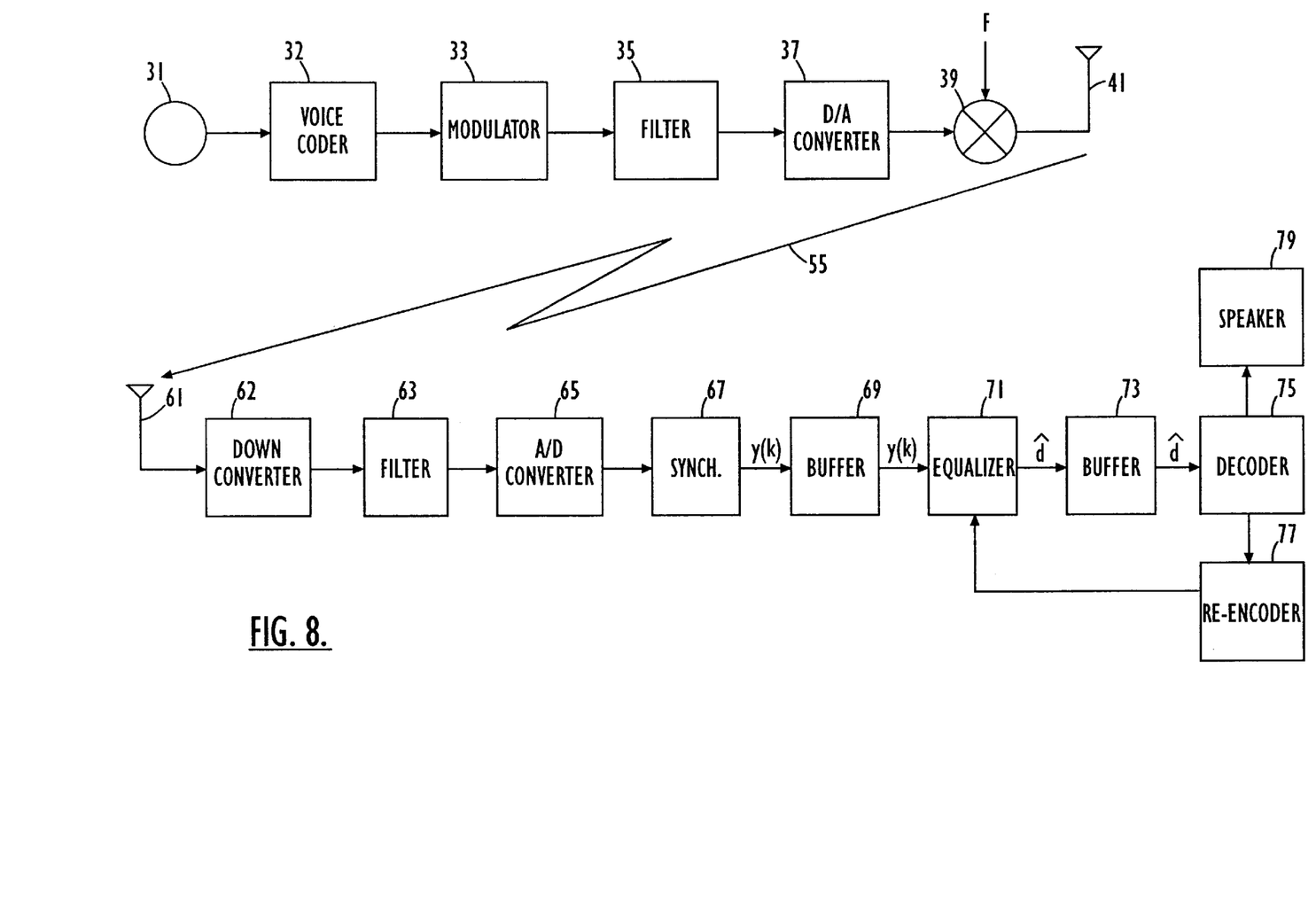
FIG. 8 is a block diagram illustrating a transmitter and a receiver according to the present invention.

A block diagram of a communications system according to the present invention is shown in FIG. 8. In particular, a communications system can include a transmitter and a receiver. As shown in FIG. 8, the transmitter can include a microphone 31, a voice coder 32, a modulator 33, a filter 35, a digital-to-analog converter 37, a mixer 39, and an antenna 41. A receiver according to the present invention can include an antenna 61, a down converter 62, a filter 63, an analog-to-digital converter 65, a synchronizer 67, a buffer 69, an equalizer 71, a buffer 73, a decoder 75, a re-encoder 77, and a speaker 79. Radio transmissions from transmitter antenna 41 to the receiver antenna 61 are transmitted over the channel 55 which may be subject to fading, dispersion, noise, and/or other distorting effects. The operations of the transmitter as well as the down converter 62, the filter 63, the analog-to-digital converter 65, the synchronizer 67, and the buffer 69 will be understood by those having skill in the art and will thus not be discussed further herein.

The transmitter and receiver of FIG. 8 can thus be used in a radiotelephone communications system such as a cellular radiotelephone communications system used to transmit voice communications between mobile terminals and base stations. Accordingly, a base station and/or a mobile terminal in a radiotelephone communications system can include a receiver according to the present invention. Receivers according to the present invention can also be used in other radio communications systems. In addition, receivers according to the present invention can be used to provide data communications as opposed to voice communications.

Figure 9:
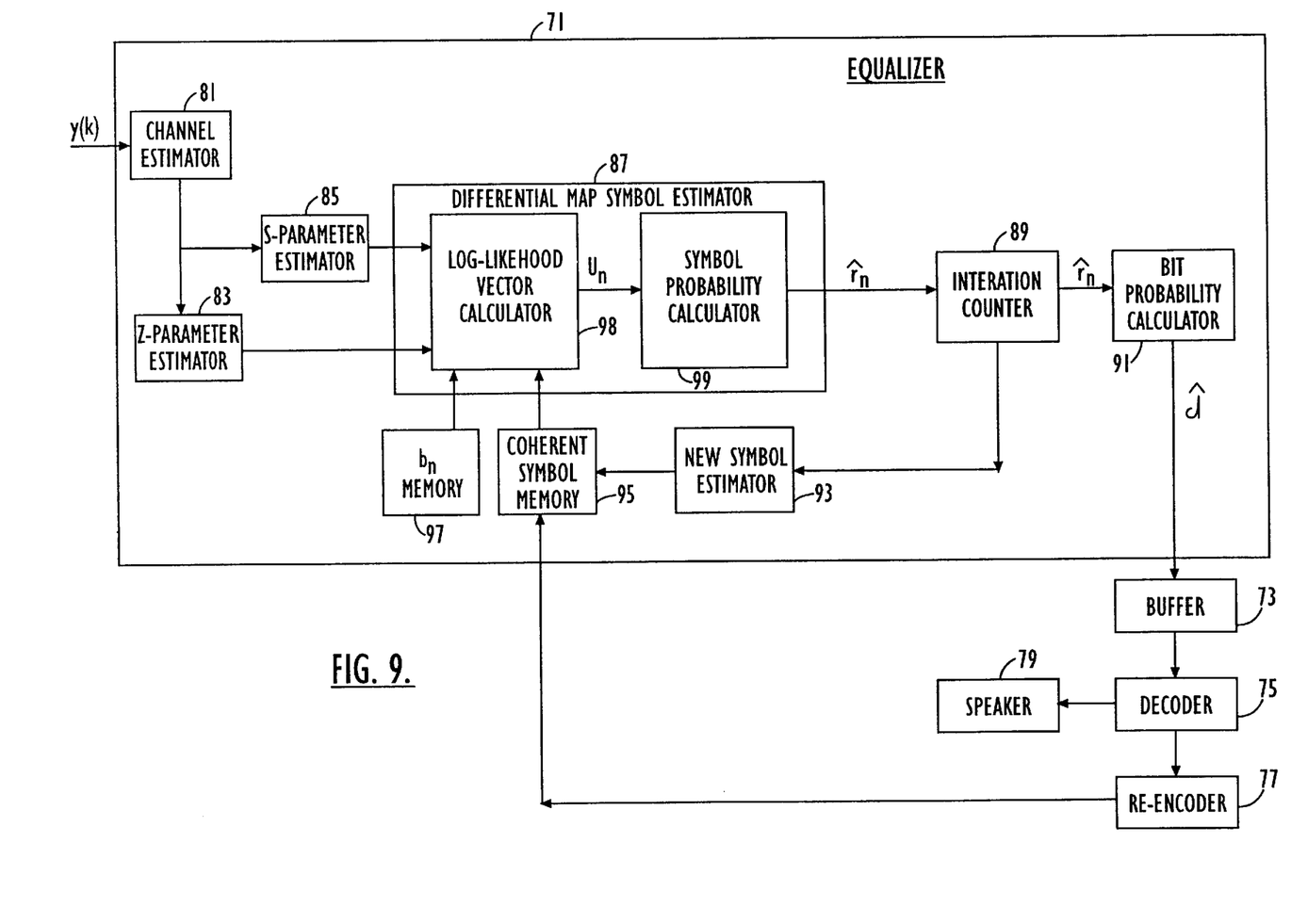
FIG. 9 is a block diagram illustrating an equalizer from the receiver of FIG. 8.
Figure 10:
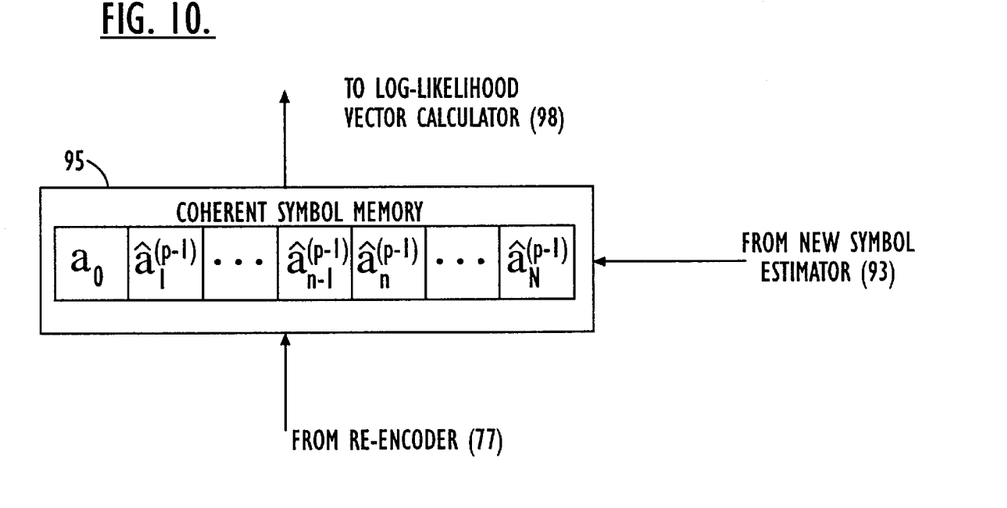
FIG. 10 is a block diagram illustrating a coherent symbol memory of the equalizer of FIG. 9.

A block diagram of the equalizer 71, the buffer 73, the decoder 75, and the re-encoder 77 of FIG. 8 is provided in FIG. 9. As shown, the equalizer 71 includes a channel estimator 81, a z-parameter estimator 83, an s-parameter estimator 85, a differential map symbol estimator 87, an iteration counter 89, a bit probability calculator 91, a new symbol estimator 93, a coherent symbol memory 95, and a $b_n$ memory 97. In addition, the differential map symbol estimator includes a log-likelihood vector calculator 98, and a symbol probability calculator 99. An expanded view of the coherent symbol memory 95 is provided in FIG. 10.

With regard to the receiver, transmissions are received at the receiver antenna 61, and down converted and filtered using down converter 62 and filter 63. The analog-to-digital converter 65 samples the filtered signal at a predetermined rate, and the synchronizer 67 selects one of the samples for each of the received symbols to generate the y-data y(k). A predetermined number of synchronized y-data samples are then stored in the buffer 69 for use by the equalizer 71. This buffered y-data y(k) is received at the equalizer 71 as shown in FIG. 9.

In particular, the y-data y(k) is received at the channel estimator 81, and s-parameter and z-parameter estimates are generated by the s-parameter estimator 85 and the z-parameter estimator 83. The differential map symbol estimator 87 generates first vector estimates $\hat{r}_n$ for each of the coherent symbols in coherent symbol memory 95 corresponding to the y-data y(k) stored in the buffer 73 during a first iteration. The new symbol estimator 93 uses the vector estimates $\hat{r}_n$ calculated during the first iteration to calculate new coherent symbol estimates which are stored in the coherent symbol memory 95 for calculating second vector estimates $\hat{r}_n$ during a second iteration. These steps are repeated to provide improved vector estimates $\hat{r}_n$. More particularly, the number of iterations used can be determined by the iteration counter 89. In particular, the iteration counter can provide for a predetermined number of iterations before accepting the vector estimates $\hat{r}_n$. A predetermined number of iterations that provides a desired level of performance can be determined by testing. Alternatively, the iteration counter 89 can compare the previous vector estimates $\hat{r}_n$ with the current vector estimates $\hat{r}_n$ at the end of each iteration to determine when the difference between the current and previous vector estimates is sufficiently small so as to provide a desired level of performance.

As discussed above, the differential map symbol estimator includes a log-likelihood vector calculator 98 and a symbol probability calculator 99. The log-likelihood calculator 98 can compute the vector values $u_n$ using Equation (13) as discussed above wherein Equation (13) is based on Equation (11). Alternately, a derivation of Equation (13) could be based on Equation (8). The symbol probability calculator 99 can use Equation (14) to generate the vector $\hat{r}_n$. In addition, Equation (14) can be written to calculate the t'th element of $\hat{r}_n$ as follows:

$$\hat{r}_n(t) = \frac{\exp(u_n(t))}{\sum_{s=0}^{D-1} \exp(u_n(s))} \quad (16)$$

In the equalizer of FIG. 9, the $\hat{r}_n$ values are calculated for each iteration using the values of the coherent symbols $a_0, \ldots a_n$ estimated during the previous iteration. For example, $a_0$ may be a known symbol such as the last coherent symbol of a synchronization word. Knowledge of $a_0$, however, is not required. The iterative calculation of the $\hat{r}_n$ values is performed for p=1 to P where P is the number of iterations to be performed. Each iteration proceeds for n=1 to N wherein N is the number of symbols stored in the coherent symbol memory 95. The number of iterations P can be set based on testing to provide a desired level of performance. Alternately, the number of iterations P can be variable with the last iteration being determined for each calculation based on a comparison of the $\hat{r}_n$ probability values from the previous and current iteration.

For each iteration, the calculations can be performed for n=1 to N computing $\hat{r}_n^{(p)}$ using $a_0, \hat{a}_1^{(p)}, \hat{a}_{n-1}^{(p)}, \hat{a}_n^{(p-1)}, \ldots, \hat{a}_N^{(p-1)}$, and computing $\hat{a}_n^{(p)} = \hat{r}_n^{(p)} b_n \hat{a}_{n-1}^{(p)}$. During the first iteration with p=1, the following equalities can be provided: $a_n = a_{n+1} = \ldots a_n = 0$. Because each vector $\hat{r}_n^{(p)}$ includes probability values, the values of $\hat{a}_n^{(p)}$ may not be restricted to the coherent symbol values, i.e., they may be "soft" symbol values. During subsequent iterations as p is incremented according to the iteration counter 89, new $\hat{a}_{n-1}$(values are calculated at the new symbol estimator 93 using the $\hat{r}_n$ (p) values of the most current iteration and saved in the coherent symbol memory 95. The new $\hat{a}_{n-1}^{(p)}$ values stored in the coherent symbol memory 95 are then used in the next iteration to calculate new $\hat{r}_n$ values. Alternately, the values $\hat{a}_n^{(p)}$ and $\hat{a}_n^{(p-1)}$ can be restricted to coherent symbol values by making $\hat{r}_n^{(p)}$ be an indicator vector (i.e., setting element with the largest probability to 1, and the rest to 0). These are "hard" symbol estimates.

As discussed above, the iteration counter 89 can provide for a set number of iterations of the calculations of the $\hat{r}_n$ values before passing the $\hat{r}_n$ values to the bit probability calculator 91. Alternately, the iteration counter 89 can determine when to pass the $\hat{r}_n$ values to the bit probability calculator 91 based on a comparison of the current and previous $\hat{r}_n$ values.

The $\hat{r}_n$ values are then passed to the bit probability detector 91 to detect soft bits $\hat{d}^{(p-1)}$ wherein each soft bit d includes a probability associated with each of the possible values the bit can have. The soft bits are stored in the buffer 73 and decoded using the decoder 75. For example, the decoder can perform a decoding validity check using, for example, a CRC check or other error detection and/or correction techniques. As will be understood by those having skill in the art, the decoder may perform the decoding validity check on a subset of the bits.

If valid, the decoder 75 can pass the bits on to the speaker 79. It will be understood that other processing such as digital-to-analog conversion can be performed between the decoder and the speaker. Alternately, the speaker may be omitted in a data processing system where voice communications are not provided. In such a data processing system, the decoder may pass the data to a processor for further use.

Preferably however, the decoded bits are re-encoded at the re-encoder 77 to provide a new set of coherent symbols $\hat{a}^{(p-1)}$ to be stored in the coherent symbol memory 95. The new set of coherent symbols $\hat{a}^{(p-1)}$ can then be used to calculate new $\hat{r}_n$ values using the iterations discussed above. In the event that the decoder does not perform the decoding validity check on all bits, the re-encoder may only generate new coherent symbols $\hat{a}^{(p-1)}$ corresponding to bits on which the decoding validity check have been performed. In this situation, the new coherent symbols may be substituted for corresponding symbols in the symbol memory while other symbols are left unchanged in the memory. The $\hat{r}_n$ values can thus be improved based on decoding and re-encoding followed by subsequent log-likelihood and symbol probability calculations. During these subsequent log-likelihood and symbol probability calculations (performed after storing the new coherent symbols corresponding to decoded bits), it may be desirable to revise in the symbol memory only estimates for those symbols not corresponding to decoded bits.

The $\hat{r}_n$ values can thus be improved by calculating the bit probabilities, decoding at least a subset of the bit probabilities to provide decoded bits, re-encoding the decoded bits to provide new symbol estimates, and then re-performing the differential map symbol estimations discussed above. The $\hat{r}_n$ values thus obtained can then be processed by the bit probability calculator and the decoder to generate received data which can then be further processed and/or provided to a speaker. Alternately, the decoded bits can again be re-encoded for another step of differential map symbol estimation.

In the drawings and specification, there have been disclosed typical preferred embodiments of the invention and, although specific terms are employed, they are used in a generic and descriptive sense only and not for purposes of limitation, the scope of the invention being set forth in the following claims. In addition, it will be understood that the buffers, equalizer, decoder, and/or re-encoder of FIGS. 8–10 can be implemented using one or more digital signal processors, integrated circuits, discrete circuits, analog circuits, and/or memories.

That which is claimed:

1. A method for receiving data transmitted over a radio communications channel wherein the data is transmitted as a plurality of sequential symbols wherein each sequential symbol is determined as a function of a previous symbol and a respective differential symbol corresponding to a portion of the data being transmitted, the method comprising the steps of:

sampling a plurality of received segments wherein the received segments correspond to respective ones of the transmitted symbols;

performing an initial differential maximum a-posterrori (MAP) symbol estimation for estimated received symbols corresponding to the sampled received segments to provide initial estimates of the differential symbols;

calculating new received symbol estimates using the initial estimates of the differential symbols previously estimated;

performing a subsequent differential MAP symbol estimation using the new received symbol estimates to provide improved estimates of the differential symbols; and performing bit probability calculations on the improved estimates of the differential symbols.

2. A method according to claim 1 wherein the steps of calculating the new received symbol estimates and performing subsequent differential MAP symbol estimation are repeated at least once and wherein the bit probability calculations are performed on the improved estimates of the differential symbols provided during subsequent differential MAP symbol estimation.

3. A method according to claim 2 wherein the steps of calculating the new received symbol estimates and performing subsequent differential MAP symbol estimation are repeated a predetermined number of times.

4. A method for receiving data transmitted over a radio communications channel wherein the data is transmitted as a plurality of sequential symbols wherein each sequential symbol is determined as a function of a previous symbol and a respective differential symbol corresponding to a portion of the data being transmitted, the method comprising the steps of:

sampling a plurality of received segments wherein the received segments correspond to respective ones of the transmitted symbols;

performing an initial differential maximum a-posterrori (MAP) symbol estimation for estimated received symbols corresponding to the sampled received segments to provide initial estimates of the differential symbols;

calculating new received symbol estimates using the initial estimates of the differential symbols;

performing a subsequent differential MAP symbol estimation using the new received symbol estimates to provide improved estimates of the differential symbols; and performing bit probability calculations on the improved estimates of the differential symbols;

wherein the steps of calculating the new received symbol estimates and performing subsequent differential MAP symbol estimation are repeated at least once and wherein the bit probability calculations are performed on the improved estimates of the differential symbols provided during subsequent differential MAP symbol estimation;

wherein the steps of calculating the new received symbol estimates and performing subsequent differential MAP symbol estimation are repeated until the improved estimates of the differential symbols converge to within a predetermined threshold.

5. A method according to claim 1 further comprising the step of:

decoding the estimates of the bit values.

6. A method for receiving data transmitted over a radio communications channel wherein the data is transmitted as a plurality of sequential symbols wherein each sequential symbol is determined as a function of a previous symbol and a respective differential symbol corresponding to a portion of the data being transmitted, the method comprising the steps of:

sampling a plurality of received segments wherein the received segments correspond to respective ones of the transmitted symbols;

performing an initial differential maximum a-posterrori (MAP) symbol estimation for estimated received symbols corresponding to the sampled received segments to provide initial estimates of the differential symbols;

calculating new received symbol estimates using the initial estimates of the differential symbols;

performing a subsequent differential MAP symbol estimation using the new received symbol estimates to provide improved estimates of the differential symbols;

performing bit probability calculations on the improved estimates of the differential symbols;

decoding the estimates of the bit values;

re-encoding the decoded estimates of the bit values to provide re-encoded received symbol estimates;

performing subsequent differential MAP symbol estimation using the re-encoded received symbol estimates to provide further improved estimates of the differential symbols; and performing bit probability calculations on the further improved estimates of the differential symbols.

7. A method according to claim 1 wherein the steps of performing the differential MAP symbol estimation each comprise:

performing log-likelihood calculations for estimated received symbols corresponding to the sampled transmission segments; and performing differential symbol probability calculations.

8. A method according to claim 1 wherein the step of performing log-likelihood calculations is preceded by the step of:

estimating channel parameters based on the sampled transmission segments wherein the log-likelihood calculations use the estimated channel parameters.

9. A method according to claim 8 wherein the step of estimating channel parameters comprises estimating s-parameters and z-parameters.

10. A method for receiving data transmitted over a radio communications channel wherein the data is transmitted as a plurality of sequential symbols wherein each sequential symbol is determined as a function of a previous symbol and a respective differential symbol corresponding to a portion of the data being transmitted, the method comprising the steps of:

sampling a plurality of received segments wherein the received segments correspond to respective ones of the transmitted symbols;

performing a differential MAP symbol estimation for estimated received symbols corresponding to the sampled received segments to provide estimates of the differential symbols;

performing bit probability calculations on the estimates of the differential symbols;

decoding the estimates of the bit values;

re-encoding the decoded estimates of the bit values to provide re-encoded received symbol estimates;

performing a subsequent differential MAP symbol estimation using the re-encoded received symbol estimates to provide further improved estimates of the differential symbols; and performing subsequent bit probability calculations on the further improved estimates of the differential symbols.

11. A method according to claim 10 wherein the step of performing bit probability calculations is preceded by the steps of:

calculating new received symbol estimates using the estimates of the differential symbols;

performing an iterative differential MAP symbol estimation using the new received symbol estimates to provide improved estimates of the differential symbols wherein the step of performing bit probability calculations comprises performing bit probability calculations on the new received symbol estimates.

12. A method according to claim 11 wherein the steps of calculating the new received symbol estimates and performing the iterative differential MAP symbol estimation are repeated at least once and wherein the bit probability calculations are performed on the improved estimates of the differential symbols provided during a last step of performing iterative differential MAP symbol estimation.

13. A method according to claim 12 wherein the steps of calculating the new received symbol estimates and performing iterative differential MAP symbol estimation are repeated a predetermined number of times.

14. A method according to claim 12 wherein the steps of calculating the new received symbol estimates and performing iterative differential MAP symbol estimation are repeated until the improved estimates of the differential symbols converge to within a predetermined threshold.

15. A method according to claim 10 wherein the step of performing the differential MAP symbol estimation comprises:
   performing log-likelihood calculations for estimated received symbols corresponding to the sampled transmission segments; and
   performing differential symbol probability calculations.

16. A method according to claim 15 wherein the step of performing log-likelihood calculations is preceded by the step of:
   estimating channel parameters based on the sampled transmission segments wherein the log-likelihood calculations use the estimated channel parameters.

17. A method according to claim 16 wherein the step of estimating channel parameters comprises estimating s-parameters and z-parameters.

18. A receiver that receives data transmitted over a radio communications channel wherein the data is transmitted as a plurality of sequential symbols wherein each sequential symbol is determined as a function of a previous symbol and a respective differential symbol corresponding to a portion of the data being transmitted, the receiver comprising:
   an analog-to-digital converter that samples a plurality of received segments wherein the received segments correspond to respective ones of the transmitted symbols;
   a differential MAP symbol estimator coupled to the analog-to-digital converter, wherein the differential MAP symbol estimator performs an initial differential MAP symbol estimation for estimated received symbols corresponding to the sampled received segments to provide initial estimates of the differential symbols;
   a new symbol estimator coupled to the differential MAP symbol estimator, wherein the new symbol estimator calculates new received symbol estimates using the initial estimates of the differential symbols, and wherein the differential MAP symbol estimator then performs a subsequent differential MAP symbol estimation using the new received symbol estimates to provide improved estimates of the differential symbols previously estimated; and
   a bit probability calculator coupled to the differential MAP symbol estimator, wherein the bit probability calculator performs bit probability calculations on the improved estimates of the differential symbols.

19. A receiver according to claim 18 wherein the differential MAP symbol estimator and the new symbol estimator iteratively calculate the new received symbol estimates and perform subsequent differential MAP symbol estimation at least twice and wherein the bit probability calculator performs the bit probability calculations on improved estimates of the differential symbols.

20. A receiver according to claim 19 wherein the differential MAP symbol estimator and the new symbol estimator iteratively calculate the new received symbol estimates and perform subsequent differential MAP symbol estimation a predetermined number of times.

21. A receiver that receives data transmitted over a radio communications channel wherein the data is transmitted as a plurality of sequential symbols wherein each sequential symbol is determined as a function of a previous symbol and a respective differential symbol corresponding to a portion of the data being transmitted, the receiver comprising:
   an analog-to-digital converter that samples a plurality of received segments wherein the received segments correspond to respective ones of the transmitted symbols;
   a differential MAP symbol estimator coupled to the analog-to-digital converter, wherein the differential MAP symbol estimator performs an initial differential MAP symbol estimation for estimated received symbols corresponding to the sampled received segments to provide initial estimates of the differential symbols;
   a new symbol estimator coupled to the differential MAP symbol estimator, wherein the new symbol estimator calculates new received symbol estimates using the initial estimates of the differential symbols, and wherein the differential MAP symbol estimator then performs a subsequent differential MAP symbol estimation using the new received symbol estimates to provide improved estimates of the differential symbols; and
   a bit probability calculator coupled to the differential MAP symbol estimator, wherein the bit probability calculator performs bit probability calculations on the improved estimates of the differential symbols;
   wherein the differential MAP symbol estimator and the new symbol estimator iteratively calculate the new received symbol estimates and perform subsequent differential MAP symbol estimation at least twice and wherein the bit probability calculator performs the bit probability calculations on improved estimates of the differential symbols;
   wherein the differential MAP symbol estimator and the new symbol estimator iteratively calculate the new received symbol estimates and perform subsequent differential MAP symbol estimation a variable number of times until the improved estimates of the differential symbols converge to within a predetermined threshold.

22. A receiver according to claim 18 further comprising:
   a decoder coupled to the bit probability calculator wherein the decoder decodes the estimates of the bit values.

23. A receiver that receives data transmitted over a radio communications channel wherein the data is transmitted as a plurality of sequential symbols wherein each sequential symbol is determined as a function of a previous symbol and a respective differential symbol corresponding to a portion of the data being transmitted, the receiver comprising:
   an analog-to-digital converter that samples a plurality of received segments wherein the received segments correspond to respective ones of the transmitted symbols;
   a differential MAP symbol estimator coupled to the analog-to-digital converter, wherein the differential MAP symbol estimator performs an initial differential MAP symbol estimation for estimated received symbols corresponding to the sampled received segments to provide initial estimates of the differential symbols;
   a new symbol estimator coupled to the differential MAP symbol estimator, wherein the new symbol estimator calculates new received symbol estimates using the initial estimates of the differential symbols, and wherein the differential MAP symbol estimator then performs a subsequent differential MAP symbol estimation using the new received symbol estimates to provide improved estimates of the differential symbols;

a bit probability calculator coupled to the differential MAP symbol estimator, wherein the bit probability calculator performs bit probability calculations on the improved estimates of the differential symbols;

a decoder coupled to the bit probability calculator wherein the decoder decodes the estimates of the bit values; and a re-encoder coupled between the decoder and the differential MAP symbol estimator wherein the re-encoder re-encodes the decoded estimates of the bit values to provide re-encoded received symbol estimates, wherein the differential MAP symbol estimator performs subsequent differential MAP symbol estimation using the re-encoded received symbol estimates to provide further improved estimates of the differential symbols, and wherein the bit probability calculator performs bit probability calculations on the further improved estimates of the differential symbols.

24. A receiver according to claim 18 wherein the differential MAP symbol estimator comprises:

a log-likelihood vector calculator that performs log-likelihood calculations for estimated received symbols corresponding to the sampled transmission segments; and a symbol probability calculator that performs differential symbol probability calculations.

25. A receiver according to claim 18 further comprising:

a channel parameter estimator coupled between the analog-to-digital converter and the differential MAP symbol estimator wherein the channel parameter estimator estimates channel parameters based on the sampled transmission segments.

26. A receiver according to claim 25 wherein the channel parameter estimator estimates s-parameters and z-parameters.

27. A receiver that receives data transmitted over a radio communications channel wherein the data is transmitted as a plurality of sequential symbols wherein each sequential symbol is determined as a function of a previous symbol and a respective differential symbol corresponding to a portion of the data being transmitted, the receiver comprising:

an analog-to-digital converter that samples a plurality of received segments wherein the received segments correspond to respective ones of the transmitted symbols;

a differential MAP symbol generator coupled to the analog-to-digital converter, wherein the differential MAP symbol generator performs a differential MAP symbol estimation for estimated received symbols corresponding to the sampled received segments to provide estimates of the differential symbols;

a bit probability calculator coupled to the differential MAP symbol generator, wherein the bit probability calculator performs bit probability calculations on the estimates of the differential symbols;

a decoder coupled to the bit probability calculator wherein the decoder decodes the estimates of the bit values; and a re-encoder coupled between the decoder and the differential MAP symbol estimator wherein the re-encoder re-encodes the decoded estimates of the bit values to provide re-encoded received symbol estimates wherein the differential MAP symbol generator performs a subsequent differential MAP symbol estimation using the re-encoded received symbol estimates to provide further improved estimates of the differential symbols, and wherein the bit probability calculator performs subsequent bit probability calculations on the further improved estimates of the differential symbols.

28. A receiver according to claim 27 further comprising:

a new symbol estimator coupled to the differential MAP symbol estimator, wherein the new symbol estimator calculates new received symbol estimates using the estimates of the differential symbols, and wherein the differential MAP symbol estimator performs an iterative differential MAP symbol estimation using the new received symbol estimates to provide improved estimates of the differential symbols, and wherein the bit probability calculator performs bit probability calculations on the new received symbol estimates.

29. A receiver according to claim 28 wherein the new symbol estimator calculates the new received symbol estimates and wherein the differential MAP symbol estimator performs the iterative differential MAP symbol estimation at least once and wherein the bit probability calculator performs bit probability calculations on the improved estimates of the differential symbols provided after a last iterative differential MAP symbol estimation.

30. A receiver according to claim 29 wherein the new symbol estimator calculates the new received symbol estimates and wherein the differential MAP symbol estimator performs iterative differential MAP symbol estimation a predetermined number of times.

31. A receiver according to claim 29 wherein the new symbol estimator calculates the new received symbol estimates and wherein the differential MAP symbol estimator performs iterative differential MAP symbol estimation a variable number of times until the improved estimates of the differential symbols converge to within a predetermined threshold.

32. A receiver according to claim 27 wherein the differential MAP symbol estimator performs log-likelihood calculations for estimated received symbols corresponding to the sampled transmission segments, and performs differential symbol probability calculations.

33. A receiver according to claim 32 wherein the differential MAP symbol estimator estimates channel parameters based on the sampled transmission segments wherein the log-likelihood calculations use the estimated channel parameters.

34. A receiver according to claim 33 wherein the estimated channel parameters comprise s-parameters and z-parameters.

* * * * *